(12) United States Patent
Kraft

(10) Patent No.: US 12,492,661 B2
(45) Date of Patent: Dec. 9, 2025

(54) COMBINED ENERGY STORAGE TURBINE AND SIMPLE CYCLE PEAKER SYSTEM

(71) Applicant: Powerphase International, LLC, Hobe Sound, FL (US)

(72) Inventor: Robert J. Kraft, Hobe Sound, FL (US)

(73) Assignee: Powerphase International, LLC, Hobe Sound, FL (US)

( * ) Notice: Subject to any disclaimer, the term of this patent is extended or adjusted under 35 U.S.C. 154(b) by 0 days.

(21) Appl. No.: 18/053,792

(22) Filed: Nov. 9, 2022

(65) Prior Publication Data
US 2023/0063511 A1    Mar. 2, 2023

Related U.S. Application Data

(63) Continuation of application No. 17/117,110, filed on Dec. 10, 2020, now Pat. No. 11,549,435.
(Continued)

(51) Int. Cl.
*F02C 6/16* (2006.01)
*F02C 7/06* (2006.01)
(Continued)

(52) U.S. Cl.
CPC .............. *F02C 6/16* (2013.01); *F02C 7/06* (2013.01); *F02C 7/08* (2013.01); *F02C 7/141* (2013.01);
(Continued)

(58) Field of Classification Search
CPC ...... F02C 6/06; F02C 6/10; F02C 6/16; F02C 7/08; F02C 7/10; F02C 7/143; F02C 1/05; F02C 1/08; F05D 2260/211
See application file for complete search history.

(56) References Cited

U.S. PATENT DOCUMENTS

| | | |
|---|---|---|
| 4,522,024 A | 6/1985 | Zaugg |
| 4,615,657 A | 10/1986 | Kreitmeier |

(Continued)

FOREIGN PATENT DOCUMENTS

DE    102014104452 A1    10/2014

OTHER PUBLICATIONS

Non-final office action, dated Feb. 9, 2022, 29 pages, issued in U.S. Appl. No. 17/191,450.
(Continued)

*Primary Examiner* — Logan M Kraft
*Assistant Examiner* — Sean V Meiller
(74) *Attorney, Agent, or Firm* — AVEK IP, LLC

(57) ABSTRACT

A system comprises a gas turbine engine. The gas turbine engine has a flow diffuser system, a combustor, a modified compressor section, and a turbine coupled to a shaft. The system includes a low pressure intercooled compressor, a high pressure intercooled compressor, a recuperator, and a compressed air storage tank. The compressed air storage tank is in selective fluid communication with the low pressure intercooled compressor via the high pressure intercooled compressor, and the recuperator. The high pressure intercooled compressor is configured to selectively receive compressed air from the low pressure intercooled compressor and is further configured to selectively compress the compressed air to a highly compressed air for storage in the compressed air storage tank. Each of the compressed air storage tank and the low pressure intercooled compressor is selectively and fluidly coupled to the gas turbine engine.

15 Claims, 11 Drawing Sheets

Related U.S. Application Data

(60) Provisional application No. 62/945,690, filed on Dec. 9, 2019.

(51) Int. Cl.
  *F02C 7/08* (2006.01)
  *F02C 7/141* (2006.01)

(52) U.S. Cl.
  CPC ...... *F05D 2220/76* (2013.01); *F05D 2240/52* (2013.01); *F05D 2240/60* (2013.01); *F05D 2260/211* (2013.01); *F05D 2260/4023* (2013.01)

(56) References Cited

U.S. PATENT DOCUMENTS

| | | | |
|---|---|---|---|
| 4,872,307 A | 10/1989 | Nakhamkin | |
| 5,845,479 A * | 12/1998 | Nakhamkin | F02C 6/16 60/777 |
| 6,865,893 B2 * | 3/2005 | Koganezawa | F02C 3/04 29/889.21 |
| 8,341,964 B2 * | 1/2013 | Finkenrath | F02C 6/16 60/727 |
| 8,863,519 B2 * | 10/2014 | Kraft | F15B 1/022 60/408 |
| 9,003,763 B2 * | 4/2015 | Coney | F01K 23/02 60/659 |
| 9,388,737 B2 * | 7/2016 | Kraft | F02C 9/18 |
| 10,247,192 B2 * | 4/2019 | Brillet | F04D 29/124 |
| 11,492,966 B2 | 11/2022 | Kraft et al. | |
| 11,549,435 B1 | 1/2023 | Kraft | |
| 12,123,348 B2 | 10/2024 | Kraft et al. | |
| 2003/0033812 A1 | 2/2003 | Gerdes et al. | |
| 2010/0083660 A1 | 4/2010 | Nakhamkin | |
| 2014/0096523 A1 | 4/2014 | Coney | |
| 2014/0096531 A1 | 4/2014 | Coney | |
| 2014/0305127 A1 | 10/2014 | Schroder et al. | |
| 2015/0192065 A1 | 7/2015 | Alekseev | |
| 2015/0233296 A1 | 8/2015 | Kraft | |
| 2017/0234227 A1 * | 8/2017 | Kraft | F01D 13/02 60/782 |
| 2021/0277825 A1 | 9/2021 | Kraft et al. | |
| 2023/0160340 A1 | 5/2023 | Kraft et al. | |

OTHER PUBLICATIONS

Notice of Allowance, dated Jul. 1, 2022, 8 pages, issued in U.S. Appl. No. 17/117,110.

Notice of Allowance, dated Jun. 24, 2024, 8 pages, issued in U.S. Appl. No. 18/051,853.

Examination Report, dated Oct. 8, 2024, 10 pages. issued in AE Patent Application No. P6000333/2021.

* cited by examiner

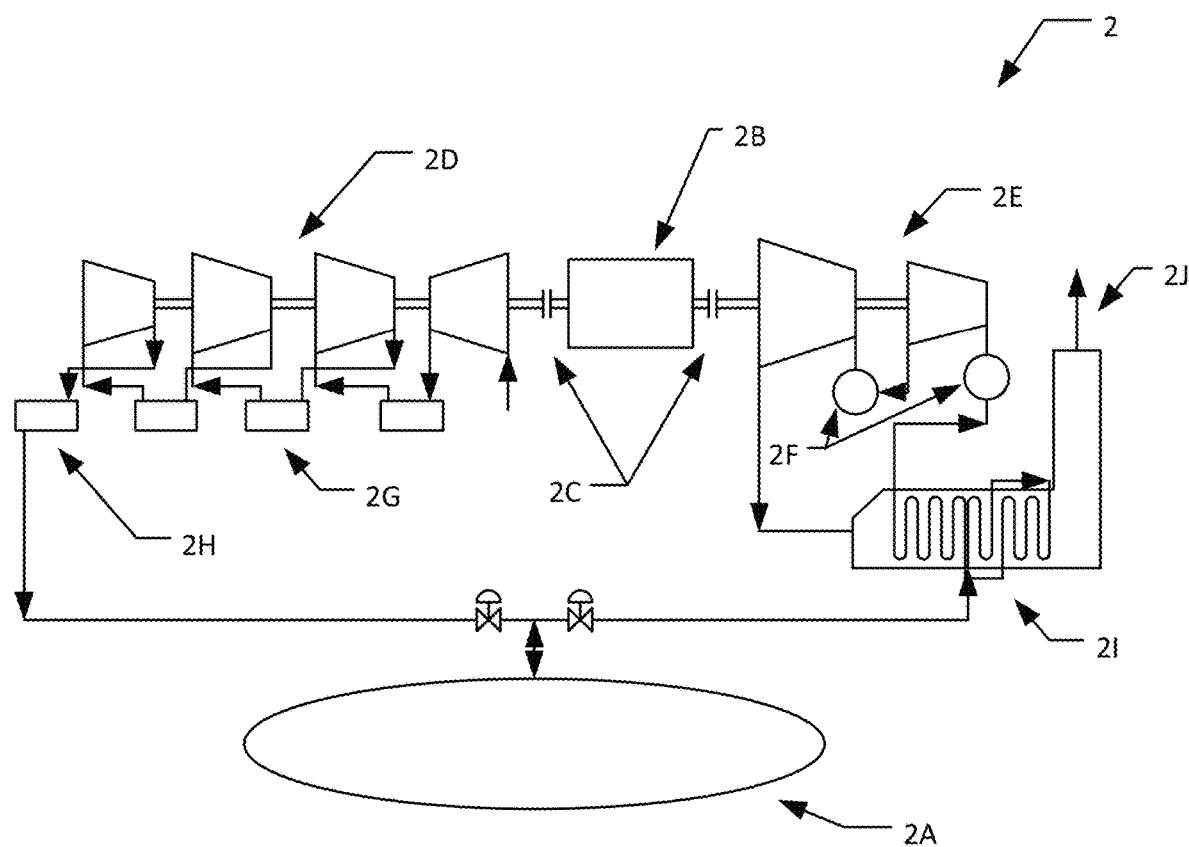
FIG. 1A – PRIOR ART

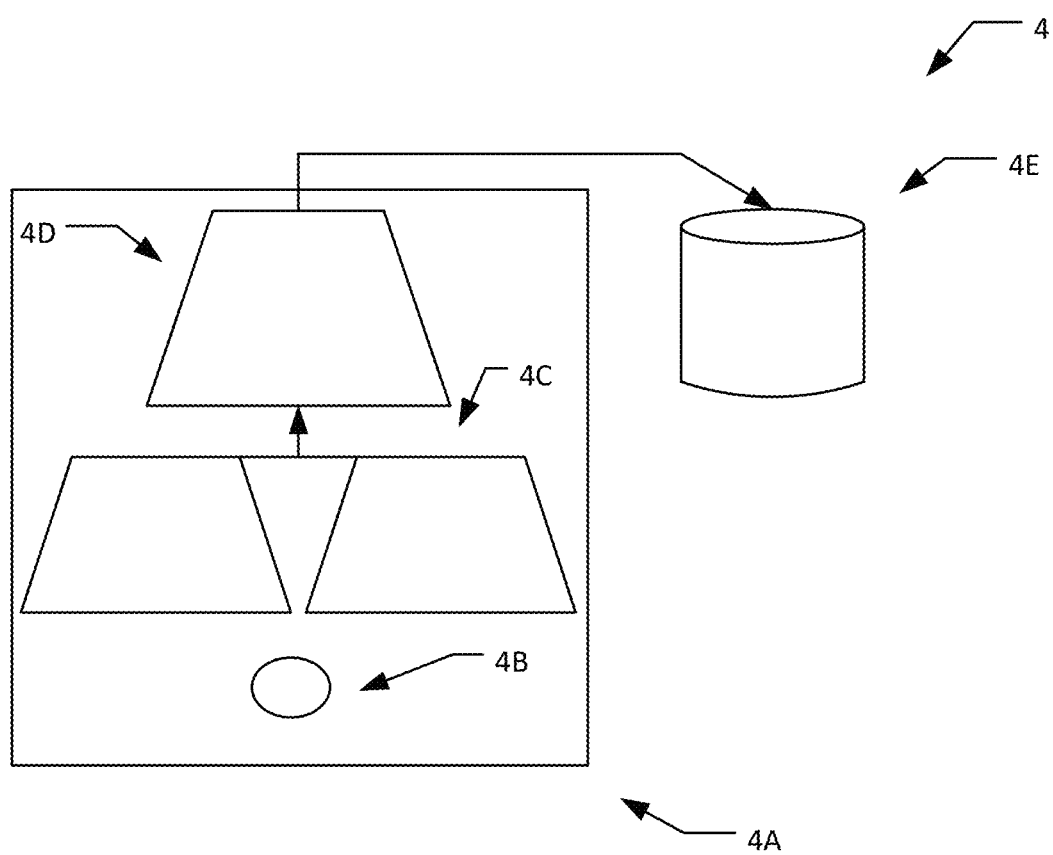
FIG. 1B – PRIOR ART

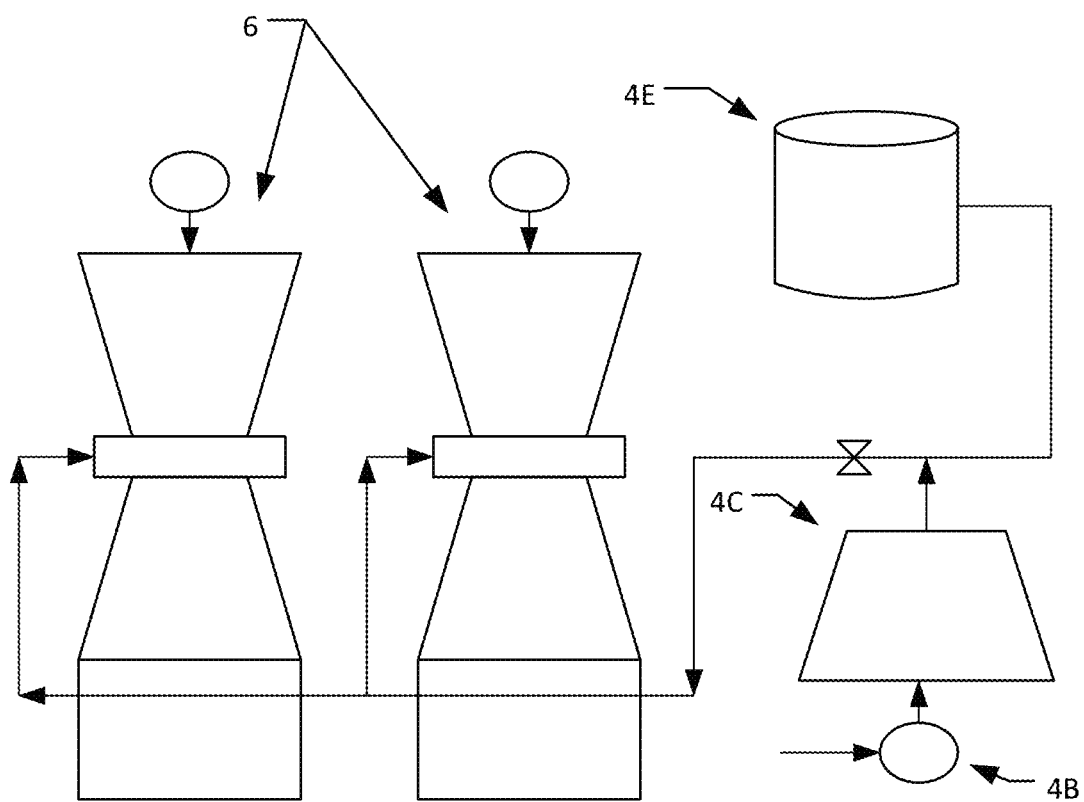
FIG. 1C – PRIOR ART

COMBINED ENERGY STORAGE TURBINE AND SIMPLE CYCLE PEAKER SYSTEM

RELATED APPLICATIONS

This application is a continuation of U.S. patent application Ser. No. 17/117,110, filed on Dec. 10, 2020, which claims priority to U.S. Provisional Application No. 62/945,690, filed on Dec. 9, 2019, the disclosure of each of which is incorporated by reference in their entirety herein.

FIELD OF THE DISCLOSURE

The disclosure relates generally to electrical power systems and methods. More specifically, the disclosure relates to methods of converting a gas turbine power plant to a grid scale energy storage plant with a continuous peaking output mode.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere herein.

In an embodiment, a system is provided. The system comprises a gas turbine engine, a low pressure intercooled compressor, a high pressure intercooled compressor, a recuperator, and a compressed air storage tank. The compressed air storage tank is selectively and fluidly coupled to the low pressure intercooled compressor, the high pressure intercooled compressor, and the recuperator. The gas turbine engine further comprises a combustor, a modified compressor section, and a turbine mechanically coupled to a shaft. The high pressure intercooled compressor is configured to selectively receive compressed air from the low pressure intercooled compressor and is further configured to selectively compress the compressed air to a highly compressed air for storage in the compressed air storage tank. The compressed air storage tank is selectively and fluidly coupled to the gas turbine engine. The low pressure intercooled compressor is configured to selectively bypass the high pressure intercooled compressor to deliver compressed air to the gas turbine engine.

In an embodiment, a system is provided. The system comprises a gas turbine engine, a low pressure intercooled compressor, a high pressure intercooled compressor, a recuperator, and a compressed air storage tank. The compressed air storage tank is in selective fluid communication with the low pressure intercooled compressor via the high pressure intercooled compressor, and the recuperator. The gas turbine engine further comprises a flow diffuser system, a modified combustor, a modified compressor section, and a turbine mechanically coupled to a shaft. The high pressure intercooled compressor is configured to selectively receive compressed air from the low pressure intercooled compressor and is further configured to selectively compress the compressed air to a highly compressed air for storage in the compressed air storage tank. Each of the compressed air storage tank and the low pressure intercooled compressor is selectively and fluidly coupled to the gas turbine engine.

In an embodiment, a method of operating a gas turbine system is provided. The gas turbine system comprises a modified compressor, a combustor, and a turbine coupled to a shaft. The gas turbine system also comprises a plurality of low pressure intercooled compressors, a plurality of high pressure intercooled compressors, and a compressed air storage tank. The method comprises generating compressed air with the plurality of low pressure intercooled compressors and forming highly compressed air by compressing the compressed air with the plurality of high pressure intercooled compressors. The method comprises storing the highly compressed air in the compressed air storage tank.

In an embodiment, a system includes a gas turbine engine which has a combustor, a modified compressor section, and a turbine coupled to a shaft. The system includes a low pressure intercooled compressor, a high pressure intercooled compressor, a recuperator, and a compressed air storage tank. The compressed air storage tank is selectively and fluidly coupled to the low pressure intercooled compressor, the high pressure intercooled compressor, and the recuperator. The high pressure intercooled compressor is configured to selectively receive compressed air from the low pressure intercooled compressor and is further configured to selectively compress the compressed air to a highly compressed air for storage in the compressed air storage tank. The compressed air storage tank is selectively and fluidly coupled to the gas turbine engine. The low pressure intercooled compressor is configured to selectively bypass the high pressure intercooled compressor to deliver the compressed air to the gas turbine engine.

In another embodiment, a system comprises a gas turbine engine. The gas turbine engine has a flow diffuser system, a combustor, a modified compressor section, and a turbine coupled to a shaft. The system includes a low pressure intercooled compressor, a high pressure intercooled compressor, a recuperator, and a compressed air storage tank. The compressed air storage tank is in selective fluid communication with the low pressure intercooled compressor via the high pressure intercooled compressor, and the recuperator. The high pressure intercooled compressor is configured to selectively receive compressed air from the low pressure intercooled compressor and is further configured to selectively compress the compressed air to a highly compressed air for storage in the compressed air storage tank. Each of the compressed air storage tank and the low pressure intercooled compressor is selectively and fluidly coupled to the gas turbine engine.

In yet another embodiment, a method of operating a gas turbine system which has a modified compressor, a combustor, a turbine coupled to a shaft, a plurality of low pressure intercooled compressors, a plurality of high pressure intercooled compressors, and a compressed air storage tank. The method includes generating compressed air with the plurality of low pressure intercooled compressors to form compressed air, compressing the compressed air with the plurality of high pressure intercooled compressors to form highly compressed air; and storing the highly compressed air in the compressed air storage tank.

BRIEF DESCRIPTION OF THE SEVERAL VIEWS OF THE DRAWINGS

Illustrative embodiments of the present disclosure are described in detail below with reference to the attached drawing figures.

FIG. 1A is a schematic layout of a PRIOR ART CAES plant.

FIG. 1B is a schematic representation of a PRIOR ART compressor train.

FIG. 1C is a schematic representation of a PRIOR ART energy storage system.

DETAILED DESCRIPTION

Figure 2:
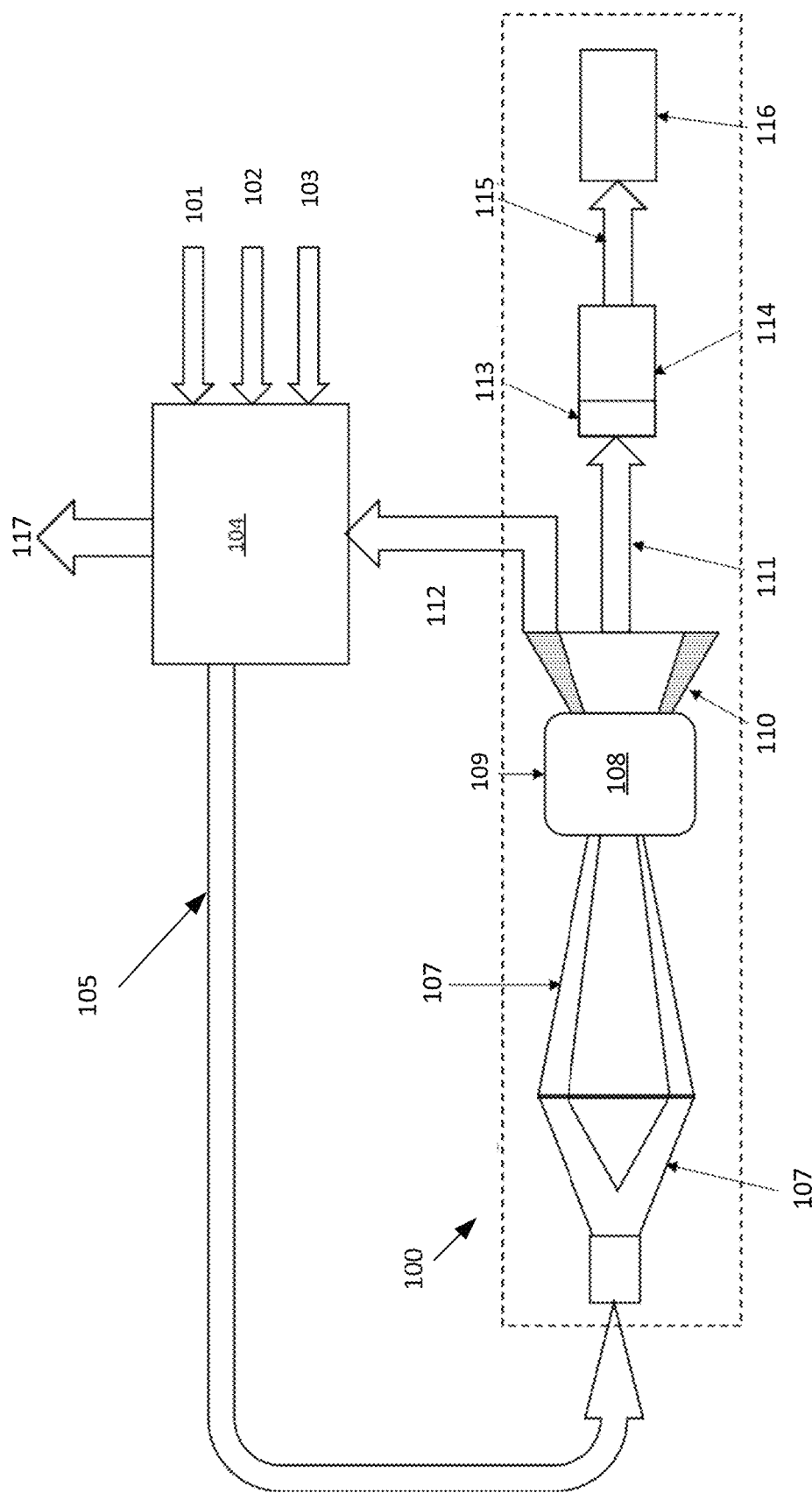
FIG. 2 is a schematic representation of a T-Phase engine, according to an embodiment of the disclosure.

Powerphase of Jupiter, Florida is a company with more than forty patents globally focused on developing products to help the current fleet of gas turbines in the world become more efficient and effective, while supporting renewable energy. For example, Powerphase has developed a patented air injection technology herein referred to as a "Turbophase" system, as seen in U.S. Pat. No. 9,388,737 B2 (the entirety of which is incorporated herein by reference), which is a hot air injection process to quickly increase the output power of a simple cycle or combined cycle gas turbine. One of the benefits of Turbophase may be the speed at which it can add power to a power plant. Specifically, the speed at which Turbophase may add power to a power plant may be similar to or faster than the traditional ramping rate of a gas turbine. Powerphase also has an energy storage product herein referred to as a "Fastlight" system, that may inject hot air into the gas turbine and may produce the same or similar benefits as Turbophase. A benefit unique to Fastlight may be that air is compressed and stored using off peak energy while additional power is delivered on peak. Combining the Turbophase and Fastlight systems with a gas turbine may add more power output (e.g., 10%-20% or so more power) to a system, which may be beneficial. However, because of the fundamental limitations of the gas turbine, the minimum load of the gas turbine may not be improved (i.e., reduced), and the use of these two systems may be required to be used in conjunction with a gas turbine.

In many parts of the world there is a large push towards renewable energy and there is a fundamental limit of how much renewable energy can be put on the grid without causing catastrophic issues like black outs. Depending on the make-up of what is on the grid to provide power and shed load dictates how much energy can be effectively managed on the grid. For example, in in areas of the U.S. with 20-30% capacity of renewable energy installed, the grids have been able to manage the load fluctuations by ramping gas turbines, load shedding, and using predictive tools to predict the fluctuations in the availability of the renewable resource. However, in Australia where they have approximately 30% renewable capacity installed, for example, the country predominately runs on coal and does not have a high capacity of gas turbines to shore up the shortcomings of the renewable energy. Consequently, they must perform frequent maintenance due to wear from cycling their systems. There are not enough fast acting gas turbine plants running to stabilize the grid during these maintenance trips, and thus their grid suffers from instability and black outs.

A solution that has been highly sought after globally to address this issue and allow for a higher renewable energy penetration is energy storage. There are many forms of energy storage. However, if one looks at grid scale storage, there have only been a few different forms that have been acted upon. Hydroelectric generators can generate large amounts of power, but they are geographically constrained and create many environmental issues. Batteries have been installed in large capacities, however, batteries suffer from being extremely expensive on top of providing some environmental concerns (e.g., via dangerous chemicals, disposal, etc.) when the batteries wear out. Compressed Air Energy Storage (CAES) systems have been used, but they are also geographically constrained and have many environmental issues as well. As a result, very few CAES plants have been built. All of these energy storage solutions attempt to address daily, weekly, or monthly cycles caused by renewable energy's intermittent lack of availability, but they all lack the ability to address seasonal energy storage. Consequently, electrical grids are made up of a significant amount of stand-by or "peaker" gas turbines that can react to the net load demands between the actual load being consumed and the renewable energy power supply.

Many utilities in the U.S. are challenged to meet the goal of increasing their renewable energy capacity and reducing their fuel consumption, while at the same time minimizing the cost to the end power consumer. As a result, some utilities in the U.S. are evaluating converting their combined cycle gas turbines to have the ability to run in simple cycle (by adding a bypass exhaust duct), which adds additional flexibility to a gas turbine plant because it reduces the gas turbine start-up time from 1-2 hours to 15 minutes. At the same time, peaking capacity is added. Some very efficient and highly sophisticated combined cycle gas turbine plants are being shut down because they are not able to respond fast enough to the net load demand.

Other issues with renewable energy stems from their inconsistent ramp rates and predictability. For example, wind energy is fairly predictable but has a much lower ramp rate than solar energy. Typically, wind blows towards a given location from the same direction on a daily basis with a seasonal trend. It can be measured at different locations, compared with weather predictions, and has ramp rates typically in the ten minute range. Solar energy, however, is more sporadic, is much harder to predict, and can have a ramp rate of one minute.

Large scale energy storage has been proven in the U.S., however the commercial application of this product is very limited due to the challenges mentioned above. In 1991 the Alabama Compressed Air Energy Storage (CAES) Plant was commissioned. FIG. 1A shows the general example arrangement of this plant 2. The plant 2 may have an underground storage 2A, a motor/generator 2B, a plurality of clutches 2C, a plurality of compressors 2D, a plurality of expanders 2E, a plurality of fuel sources 2F, a plurality of intercoolers 2G, an aftercooler 2H, a recuperator 2I, and an exhaust stack 2J. Ambient air is compressed in one 50 MW compressor train and stored in an underground cavern with a capacity to store for 26 hours. When the air is released from the cavern at 650 psi, it is first heated in a recuperator and then sent to a high pressure burner, expanded in a specially designed High Pressure (HP) turbine, then reheated in a low pressure burner, and further expanded to atmosphere in a modified turbine (501D type). If one divides the fuel consumption by the net power output during the power cycle, and ignores any energy associated with the compression cycle, the heat rate is 4,100 BTU/kWh. The main issue holding this technology back from widespread adoption is the fact that it needs to be co-located with an underground cavern and there are not that many places in the world where this can be done. The locations for these facilities need to be both near load pockets and near areas that really need the energy storage.

Another significant drawback is the system is more than 30 years old and utilizes specialty HP burners which have high NOx production and are not state of the art like what exists for gas turbines today. Another characteristic of this CAES system is that it operates at relatively high pressures compared to commercially available gas turbines which increases the air storage tank size required for a given number of hours of desired output. This may not have been an issue for CAES when using an underground cavern, however, when attempting to site this product and utilize above ground tank storage, it drives the cost extremely high. Another challenge for this system is that the compression cycle is binary (i.e., the systems is only either fully on or fully off), so there is very little flexibility on power consumption during the compression process because it uses one shaft line. Similarly, on the power cycle, because of the limitations on the HP expander section, there is not much turn down capability. In summary, although this product is relatively straight forward, is has severely limited implementation and has limited flexibility in its ability to ramp power consumption and power output. Also, just like every other energy storage system available today, once the charge is spent (i.e., the air tank is empty or discharged down to its usable pressure), the power cycle stops.

Powerphase, while producing and installing the Turbophase and Fastlight systems, realized that it was possible to add a continuous power mode to a gas turbine with continuous electric air injection storage system by breaking the compression process into two parts: a low pressure that is matched to the low pressure expander in the gas turbine and a high pressure that is matched to the maximum pressure of the air storage tank. Such an arrangement can be seen in more detail in U.S. Patent Pub. 2018/0156111 (the entirety of which is incorporated herein by reference), showing two stage compression with a continuous mode. The low pressure compressor may feed the high pressure compressor for the storage process and may be driven by two separate electric motors which allows for simple and separate operation. During the power mode, the low pressure compressor can be used to generate additional air flow to the gas turbine for incremental power, which may ultimately reduce the cost of the storage system on a cost per kilowatt basis (i.e., cost stays the same and kW output goes up). This also addresses the air storage tank sizing issue by reducing the volume and cost requirement for a given total mass flow requirement because additional air is generated in real time to supplement the air flow from the tank.

As another example, as shown in FIG. 1B, Powerphase has developed a commercial "Fastlight" system 4, as it is referred to herein, that has one compressed air train 4A consisting of two low pressure compressors 4C (LPC), an electric motor 4B, and one high pressure compressor 4D (HPC) that consumes 2.8 MW per LPC 4C and 2.4 MW for the HPC 4D which equals 8 MW per compressor "train" 4A. The train 4A delivers air at a total of 30 lb/sec to the storage tank 4E at 1500 psi. However, the two LPCs 4C can run independent of the HPC 4D in the power generation mode and deliver 30 lb/sec to a Gas Turbine (GT) at ~180 psi. For instance, the Fastlight system may inject air into a GT (e.g., a 6B GT) and consume 5.6 MW during a continuous power generation mode. If the tank 4E was sized for four hours of storage, then the total energy consumed would be 8*4 hrs=32 MWhr. It is also true that the LPC 4C and HPC 4D compressors do not consume as much power at low pressures compared to the peak pressure, so when the complete storage process is evaluated starting at a pressure similar to the output of the LPC 4C and ending at the HPC 4D maximum pressure, the average power consumed in that process is approximately 80% of the peak power, or in the example above, 0.8*32 MW=25.6 MW per hour on average over the charge cycle.

During the discharge power generation mode 30 lb/sec can be released from tank 4E for four hours producing 9 MW net power output. In embodiments, the LPC 4C can be run simultaneously with air being released from the storage tank 4E which may add another 30 lb/sec of air, for a total of 60 lb/sec warm air for injection. When 60 lb/sec of air is injected into compressor discharge case of 2 6B gas turbines 6 (see FIG. 1C), 30 lb/sec per GT, the GTs produce 18 MW of gross output increase. Because the LPCs 4C are consuming 5.6 MW, this results in a net power output of 12.4 MW for four hours or a 50 MWhr output system. The fuel consumption for two 6B gas turbines 6 with 30 lb/sec of air injection holding firing temperature constant is 50 MBTU/hr per GT, therefore the heat rate during injection resulting in 12.4 MW is 100,000,000 BTU/12,400 kW or 8064 BTU/kW hr incremental heat rate. If just the air is let out of the tank 4E, the incremental power is 9 MW and the fuel burn is 50 MBtu/hr, or an incremental heat rate of 5,555 BTU/kWhr. The system also has a continuous "peaker" mode where the 30 lb/sec is injected into the gas turbines 6 producing 9 MW gross, but netting out the 5.6 MW LPC load. This results in a 3.4 MW net while consuming 50 MBtu/hr, giving a heat rate of 14,700 BTU/kWhr. If, for example, the Fastlight system described above is sold for $6M USD, then the air discharged from the tank 4E only would yield $6M/9000 kW, or $666/kW. When the LPC 4C air is added, the cost per kW is reduced to $6M/12400 kW, or $483/kW which is a 27% cost reduction.

An alternative to the Fastlight technology is disclosed herein, which may in certain applications have specific advantages thereover. This alternative is sometimes referred to herein as "Turbophase" or "T-Phase" engine technology. The T-Phase engine technology may involve a more powerful grid scale energy storage system as well as a powerful peaker turbine engine. Where Fastlight is an air injection system for a running gas turbine, the T-Phase engine technology may be a new or modified gas turbine where the entire compression process is removed from the main shaft line of the gas turbine. The T-Phase engine technology may include new operation modes and, when combined with some existing technologies, may address one or more of the commercial drawbacks to a traditional CAES (or other) plant.

As discussed above, there are several issues holding traditional CAES technology back from widespread adoption: 1) it needs to be co-located with an underground cavern, 2) the system is decades old and utilizes specialty HP burners which have high NOx production and are not state of the art like what exists for gas turbines today, 3) it operates at relatively high pressures compared to commercially available gas turbines which increases the above ground air storage tank size required for a given number of hours of output desired, 4) the compression cycle is binary, so there is very little flexibility on power consumption during the compression process because it uses one shaft line, which also eliminates the possibility to have a peaker mode, 5) because of the limitations on the HP expander section, there is not much turn down capability, and 6) once the charge is spent, in this case the air tank is discharged down to its usable pressure, the power cycle stops. Embodiments of the T-Phase engine technology described herein may address the issues detailed above.

FIG. 2 shows a schematic of an engine (e.g., a T-Phase or Turbophase engine) 100, according to an embodiment of the present disclosure. The T-Phase engine 100 may comprise a flow diffuser 106, a modified compressor 107, a conventional combustor 108, a conventional turbine 110, a thrust bearing 113, a clutch/gearbox 114 coupling a shaft 111 of the turbine 110 to a generator 116, and a recuperator 104 configured to receive hot exhaust 112 of the engine 100 to heat air being fed to the recuperator 104 from one or more of a plurality of sources.

Specifically, air may be delivered to the recuperator 104 by any combination of air from an air storage supply 101, one or more Low Pressure Intercooled Compressor (LPIC) supplies 102, and/or one or more Turbophase or T-Phase Module (TPM) supplies 103. These three air sources are described in more detail below. Independent of where the air is being supplied from, the air may pass through the recuperator 104. The recuperator 104 may consist of a shell and tube heat exchanger with tubes, where the exhaust 112 from the T-Phase engine 100 would flow through the shell and the pressurized air from the air sources 101, 102, and/or 103 would flow inside the tubes. As the pressurized air flows through the recuperator 104, it may extract heat from the exhaust 112 and generate hot compressed air 105. The recuperator 104 of the engine 100 may be selectively configured to have the pressurized air flow 101, 102, and/or 103 through the recuperator 104 and T-Phase engine exhaust 112 at the same flow rate. The pressurized air flow 101, 102, and/or 103 may, however, have some or all their flow be intentionally bypassed around the recuperator 104 for any number of reasons, such as for combustion stability or other temperature constraints (e.g., where it is desired for the pressurized air flow 101, 102, and/or 103 to not extract too much heat).

The hot compressed air 105 may be introduced to the inlet of the compressor 107 through a flow diffuser 106 whose purpose is to take the hot compressed air 105 to an anulus feeding the inlet of the engine 100. At the interface of the flow diffuser 106 and the modified compressor 107, a seal may be located to keep the high pressure air in the flow path and out of the front bearing compartment. The modified compressor 107 may be a substantially empty flow path, where conventional compressor rotating and/or static airfoils (i.e., stators) have been removed. As one skilled in the art can appreciate, the stators typically form the inner diameter flow path between the rotating blades. The T-Phase engine 100 may have newly manufactured compressor blades with extended and interlocked platforms to form the flow path inner diameter. The stators may have the airfoils removed so that just the outer diameter of the flow path exists. The last set of stators, typically referred to as the exit guide vanes, may be left in place to straighten out the flow which exits into the compressor discharge plenum which feeds the combustion system 108. In embodiments, the compressor 107 may be newly constructed as described above, as opposed to modifying an already existing compressor. The modified compressor 107 of the T-Phase engine 100 may passively direct air to the combustion system 108, as opposed to actively directing the air thereto. This feature may be distinct from prior art gas turbine compressors, since it may allow the compressor 107 to function with no power draw (i.e., the compressor 107 may operate without the use of electricity). Because any power drawn by the gas turbine compressor may detract from the net power generated by the gas turbine, this feature may provide a significant advantage over conventional gas turbine engines.

Fuel 109 is delivered to the standard combustion system 108 to elevate the temperature of the air before it is discharged into the turbine section 110 where power is made and delivered out the output shaft 115 (e.g., to the generator 116). FIG. 2 depicts an example hot end drive gas turbine, though however, as one skilled in the art can appreciate, several gas turbine types have cold end drive and the T-Phase engine 100 may accommodate this by passing the output shaft through the flow diffuser 106, in embodiments.

In traditional gas turbines, the forward load developed in the compressor section is somewhat balanced by the aft load generated in the turbine section. With the T-Phase engine 100, since there is no conventional compressor section, there is only an aft load generated in the turbine section. To address this, a thrust bearing 113 may be added somewhere along the shaft line 111. The T-Phase engine 100 embodiments contemplate adding a clutch integrated into or separate from the gearbox 114 such that the generator 166 can continue to spin if the T-Phase engine 100 is off which may provide valuable synchronous condensing function. The output from the thrust bearing 113 and/or the clutch gearbox assembly 114 may drive the generator 116.

Figure 3:
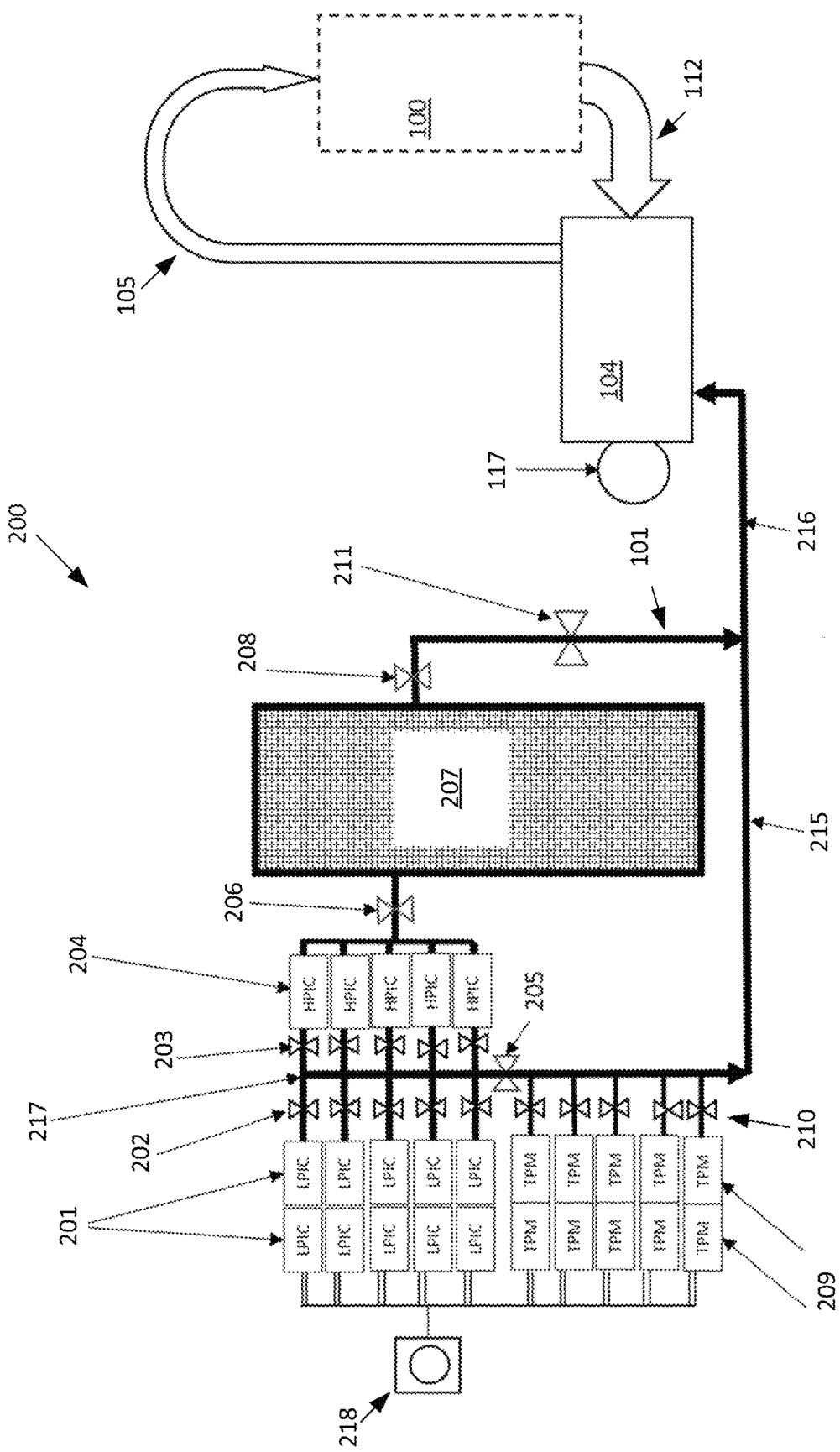
FIG. 3 is a schematic representation of a supplementary air supply system for supplying air to the engine of FIG. 2, according to an embodiment.

In FIG. 3, an example T-Phase engine 100 plant layout is shown with a supplementary air supply 200. One or more LPICs 201 may be arranged to supply a charge air pipe 217, and these LPICs 201 may be isolated from the charge air pipe 217 with one or more LPIC valves 202. The charge air pipe 217 may be in fluid connection with one or more High Pressure Intercooled Compressors (HPIC) 204, and may be selectively isolated from an intermediate air pipe 215 with an LPIC/HPIC isolation valve 205. The charge air pipe 217 may be selectively isolated from the HPICs 204 by one or more HPIC valves 203.

When the T-Phase engine 100 is charging a compressed air storage system 207, the LPIC/HPIC isolation valve 205 may be closed and one or more of the LPIC valves 202 may be open to allow air from the LPICs 201 to flow into the charge pipe 217. The HPIC valves 203 may be open, allowing air from the LPICs 201 to feed into the HPICs 204. In turn, the HPICs 204 may further increase the pressure of the air and route the highly pressurized air towards the air storage system 207. Before the air is delivered to the air storage system 207, the air may pass through a storage incoming isolation valve 206, which may selectively isolate the air storage system 207 from the HPICs 204. When open, the storage incoming isolation valve 206 may allow the HPICs 204 to charge the air storage system 207. When it is desired to store and maintain a supply of pressurized air, the air storage system 207 may be selectively precluded from discharging by closing an air storage outlet isolation valve 208. In embodiments, as described in more detail below, there may be modes of operation where some or all of the air being compressed by the HPICs 204 and the LPICs 201 may be charging the storage system 207 while the LPIC/HPIC isolation valve 205 is partially open, which may allow some of the air from the LPICs 201 to enter the intermediate air pipe 215.

In embodiments, the T-Phase engine 100 may alternately or additionally have one or more TPMs 209 for selectively delivering hot compressed air to the intermediate air pipe 215 via one or more TPM isolation valves 210. Each TPM 209 may be configured to independently produce hot compressed air. For instance, each TPM 209 may have a recuperator which the compressed air produced by the TPM 209 is passed through to extract heat. The recuperator may heat the compressed air by using waste heat and/or exhaust that is generated by other components. For example, the recuperator may heat the compressed air by using waste heat/exhaust from one or more motors (e.g., electrically driven motors, liquid or natural gas fueled motors, etc.) that drive the plurality of TPMs 209 and/or LPICs 201. As another example, the recuperator may heat the compressed air using the exhaust of the T-Phase engine 100. The artisan would understand that any suitable number of LPICs 201 and/or TPMs 209 may be used with the T-Phase engine 100. While the present embodiment may use intercooled compressors in the LPICs, 201, the HPICs 204, and/or the TPMs 209, other embodiments alternately or additionally may cool these compressors 210, 204 and/or 209 through an external cooling system 218. In still more embodiments, the compressors 201, 204, 209 may forego extra cooling steps altogether.

During a power generation mode, the storage exit isolation valve 208 may be opened and air may flow from the storage system 207 through a regulator 211. The regulator 211 may drop the pressure of the air to meet the pressure requirements of the T-Phase engine 100 before the air enters the final air pipe 216. The final air pipe 216 may direct air to the recuperator 104, where the air may be heated with the T-Phase engine 100's exhaust. Additionally, in embodiments, the TPMs 209 may be operated to generate hot compressed air which may also be added to the final air pipe 216. Similarly, in some embodiments, the LPIC valves 202 may be opened and the HPIC valves 203 may be closed so that air from the LPICs 201 may be added to the final air pipe 216 through the intermediate air pipe 215, alternately or additionally to the air from the TPMs 209 and/or the storage tank 207. All of the air in the final air pipe 216, unless it is desired to bypass the recuperator 104 with some or all of the air in the final air pipe 216, may travel through the recuperator 104 where it is heated with the exhaust 112 of the T-Phase engine 100. The heated air may travel to the T-Phase engine 100 through the hot air delivery pipe 105, whereupon it may generate power in the T-Phase engine turbine section 110 (FIG. 2). This may result in the air delivered to the engine 100 dropping in pressure and temperature (e.g., dropping closer to atmospheric air pressure and temperature conditions). The hot exhaust 112 may exit the engine 100 and may be routed through the recuperator 104, where the exhaust 112 may be used to heat the incoming air from the final air pipe 216, and may be released into the atmosphere via the exhaust stack 117 (FIG. 2).

Figure 5:
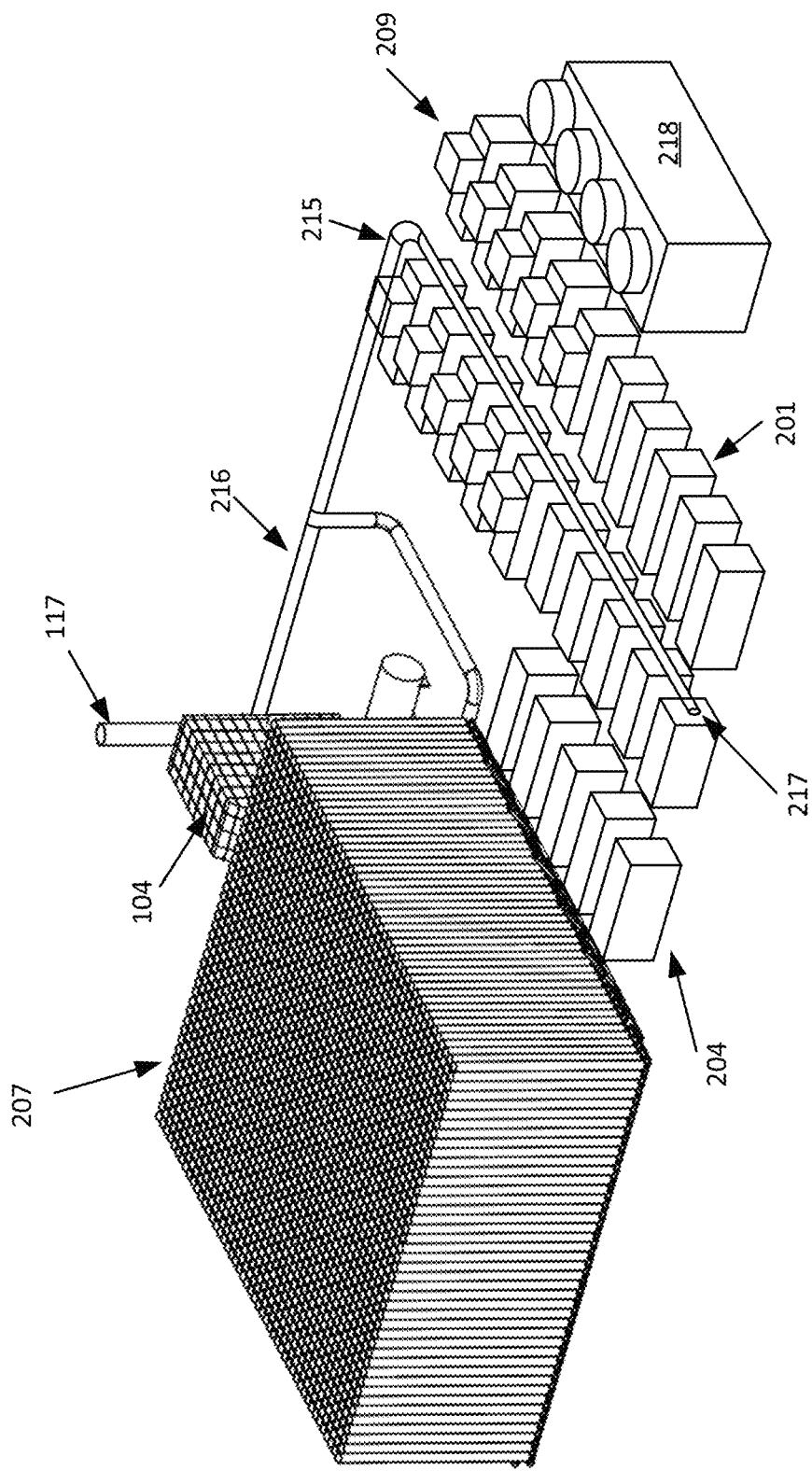
FIG. 5 is a schematic representation of a supplementary air supply system for supplying air to the engine of FIG. 2, according to another embodiment.

FIG. 5 shows an arrangement of the supplementary air supply system 200, in another embodiment. Here, alternate or additional components to the supplementary air supply system 200 may be seen, such as a larger cooling system 218. The cooling system 218 may be used with the LPICs 201, the HPICs 204, and/or TPMs 209 to decrease the temperature of the air being compressed, thus increasing the efficiency of the air compression process. FIG. 5 demonstrates how compact the supplementary air system 200 can be, allowing the T-Phase engine 100 to output power at a similar rate to conventional gas turbine engines while maintaining a smaller footprint. Not only will a smaller footprint decrease the cost of the T-Phase engine and supplementary air system embodiments described herein, but may also allow the embodiments described herein to be situated in more locations, such as those where conventional systems may be too large to be suitable fitted without undue cost.

Table 1 below shows typical 6B gas turbine parameters at maximum flow, generating 44 MW of output, as well as additional information for a 6B T-Phase engine 100 operating at maximum flow. The turbine power of the 6B gas turbine is actually 91.6 MW and the compressor draw is 47.6 MW, leaving a net gain of 44 MW. With the T-Phase engine 100, since the compressor may draw no power, as discussed above, the shaft for the 6B T-Phase engine 100 may see the actual 91.6 MW. Consequently, the shaft 111, the clutch/gearbox 114, and/or the thrust bearing 113 of the 6B T-Phase engine 100 may be constructed to withstand the additional power. Additionally, the 6B T-Phase engine 100 may burn 458.3 MBTU/hr LHV of fuel (e.g., to power the various compressors 201, 204, and/or 209).

TABLE 1

| 6B gas turbine and 6B T-Phase engine 100 parameters at maximum flow | | | |
|---|---|---|---|
| | | | 6B GT At Full Flow |
| TIT | F | | 2,035 |
| GT Exhaust Temperature | F | | 970 |
| GT Exhaust Flow | lb/sec | | 342 |
| GT Compressor Inlet Flow | lb/sec | | 335 |
| GT Compressor Discharge Pressure (CDP) | psi | | 190 |
| GT Compressor Discharge Temperature (CDT) | F | | 648 |
| GT Exhaust Temperature | F | | 970 |
| GT Gross Output | kW | | 44,000 |
| Turbine Power | kW | | 91,592 |
| Compressor Power | kW | | 47,592 | 52% |
| Plant Fuel Burn (HHV) | BTU/HR | | 508,792,608 |
| Plant Fuel Burn (LHV) | BTU/HR | | 458,371,719 |
| Emissions Summary | | | |
| Total NOx Emissions | lb/hr | | 342 |
| Total CO Emissions | lb/hr | | 970 |
| GT NOx Emissions (HHV) @ 25 ppm (No SCR) | lb/MBBTU | 0.0921 | |
| TPM NOx Emissions (HHV) (No SCR) | lb/MMBTU | 0.165779 | |
| GT CO Emissions (HHV) @ 2 ppm | lb/MMBTU | 0.00448 | |
| TPM CO Emissions (HHV) after 93% CO Assumptions (at full flow) | lb/MMBTU | 0.0358 | |
| Recuperator pressure drop | psi | | 8 |
| Manifold pressure drop | psi | | 8 |
| Air temperature exiting the storage tank | F | | 32 |
| LP compressor flow | lb/sec | | 16.731 |
| LP elect power per compressor | kW | 2860 | |

TABLE 1-continued

6B gas turbine and 6B T-Phase engine 100 parameters at maximum flow

| | | 6B GT At Full Flow |
|---|---|---|
| Number of LP compressors | | 10 |
| Total flow of LP compressors full on | lb/sec | 168 |
| LP compressor exit pressure for injection | psi | 206 |
| LP pressure ratio (14.7 Pamb) | | 14.026 |
| LP pressure ration per stage | | 1.94 |
| HP compressor exit pressure for storage tank | psi | 1,500 |
| HP compressor PR | | 7 |
| HP PR per stage (s stages) | | 1.92 |
| HP compressor power | kW | 4,694 |
| HP compressor flow rate | lb/sec | 33 |
| Energy extracted from exhaust | BTU/kWh | 52,043 |
| Temperature increase of air exiting the tank | F | 619 |
| Compressed air recuperator exit temperature | F | 651 |
| GT exhaust temperature after recuperator | F | 351 |
| Turbine output | MW | 91,592 |
| Heat rate with tank air flow only | BTU/kWh | 5,005 |
| Net power to run LP compressors full on | kW | 28,648 |
| Net plant output with LP compressors full on | kW | 62,944 |
| Turbophase fuel burn per TPM (2.6 MW) | BTU/HR | 20,600,000 |
| Number of TPMs = | | 11 |
| Flow per TPM | lb/sec | 15 |
| Mass flow of all TPMs | lb/sec | 167 |
| Mass flow of all TPMs and storage tanks (storage at half flow and LP compressors fill on) | lb/sec | 335 |
| Heat rate for T-Phase with 0.5 tank flow from storage tank | BTU/kWh | 7,282 |
| Heat rate for T-Phase with no tank flow, LP compressors full on and TPMs full on | BTU/kWh | 10,882 |

Figure 4A:
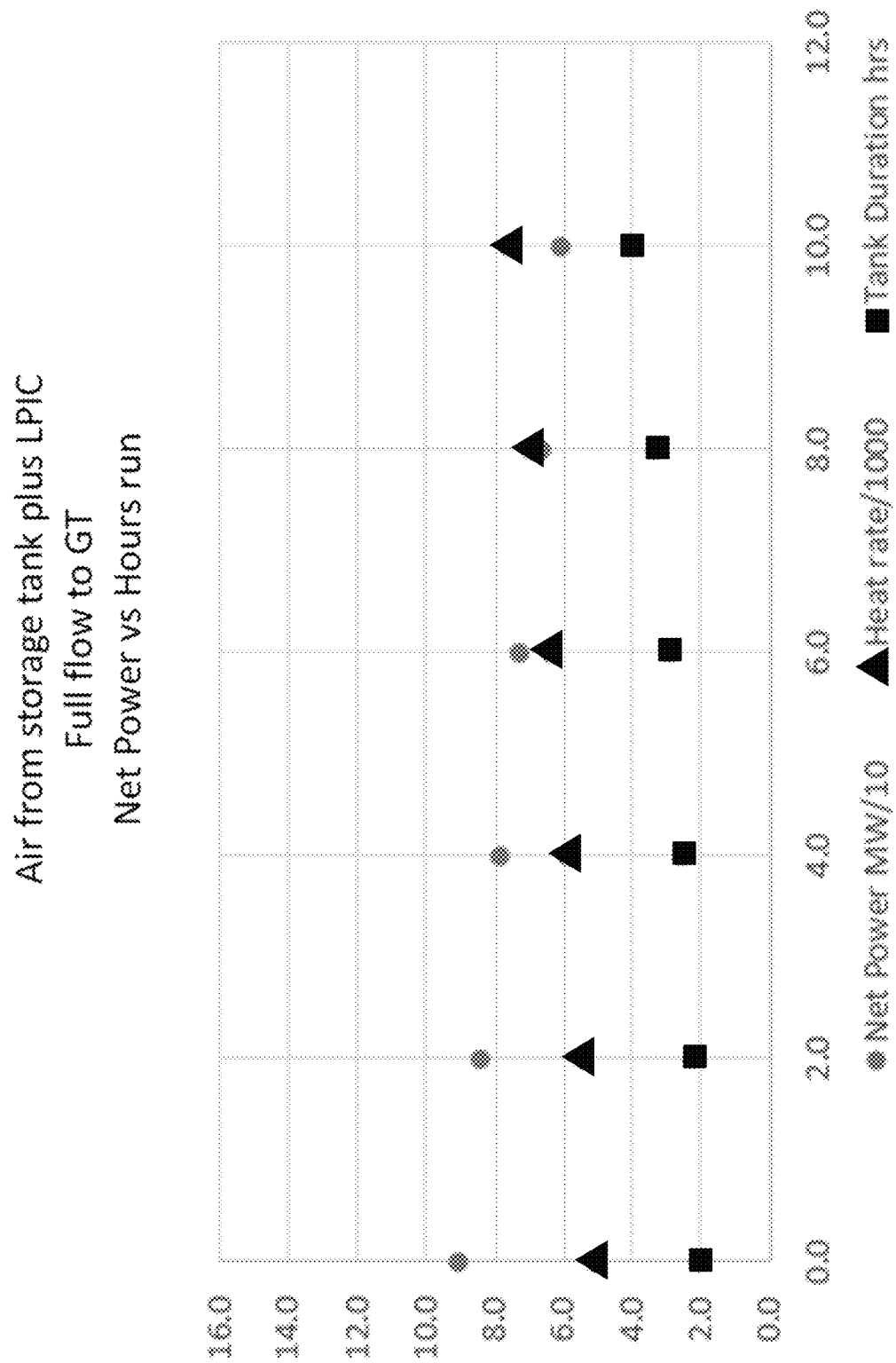
FIGS. 4A-4E are graphical representations illustrating the workings of the engine of FIG. 2.
Figure 4B:
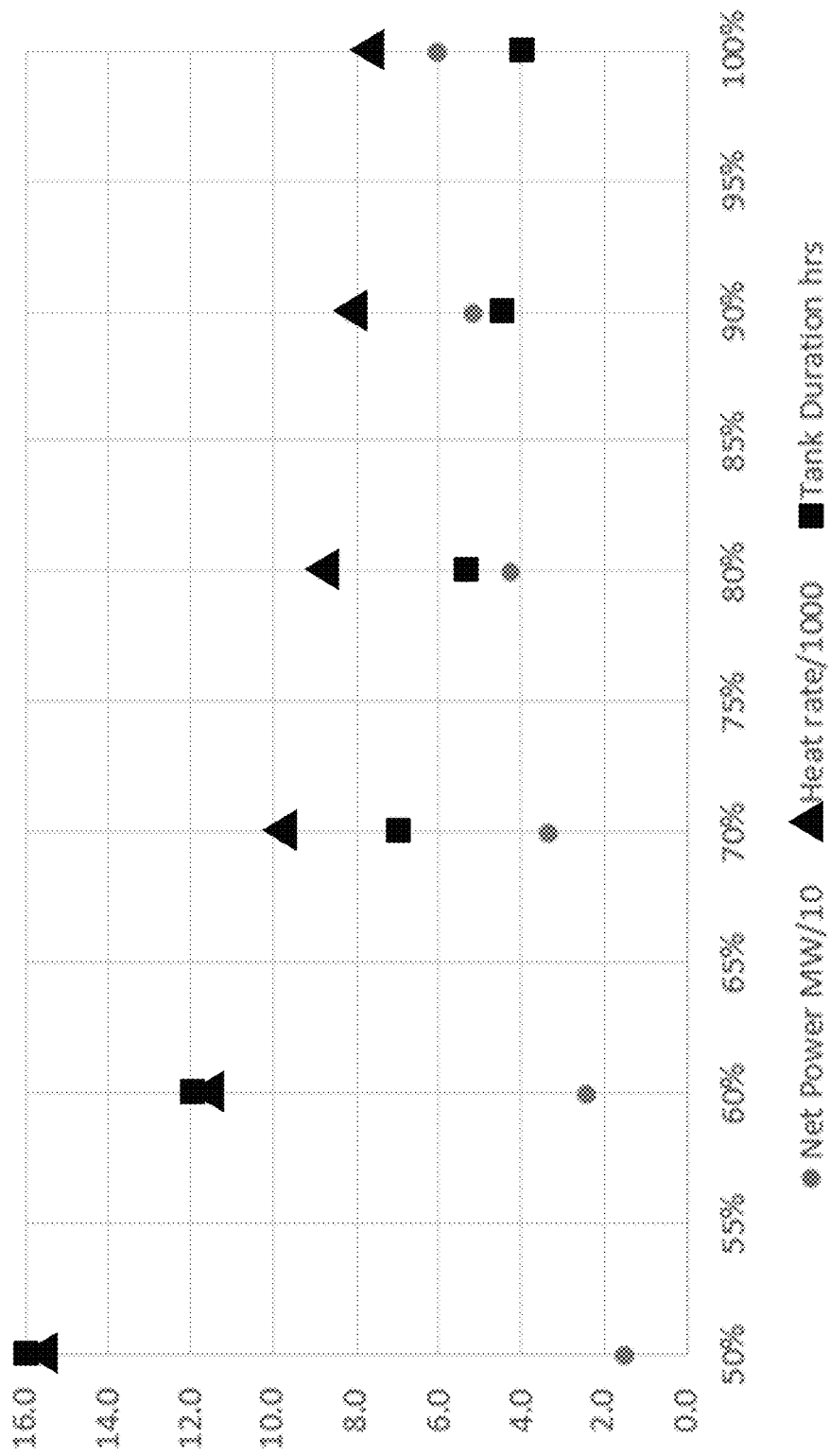

Tables 2A and 2B below show various modes of operating the T-Phase engine 100 which may allow for a range of power output anywhere between 14.7 MW and 90 MW by operating different numbers of LPICs 201 and/or TPMs 209, and by varying the air flow rate to the T-Phase engine 100 within the guidelines of conventional 6B, or other, gas turbines. FIGS. 4A and 4B are graphical representation of the data in Tables 2A and 2B, respectively. FIG. 4D is another graphical representation of the data of 2A and 2B, showing the relationship between the heat rate and the net power output of the T-Phase engine 100.

TABLE 2A

Power discharge mode at full flow while operating LPICs

| Parameters | | Power Discharge Mode-extending air tank duration by running LIC | | | | | |
|---|---|---|---|---|---|---|---|
| % flow to GT | % | 100% | 100.00% | 100% | 100% | 100% | 100% |
| Tphase Net output MW | MW | 90.1 | 84.2 | 78.3 | 72.3 | 66.4 | 60.5 |
| Plant BOP aux load | MW | 1.5 | 1.5 | 1.5 | 1.5 | 1.5 | 1.5 |
| Flow to Tphase | LB/sec | 335.2 | 335.2 | 335.2 | 335.2 | 335.2 | 335.2 |
| # LPC injecting | Qty | 0.0 | 2.0 | 4.0 | 6.0 | 8.0 | 10.0 |
| LPIC Flow | LB/sec | 0.0 | 33.5 | 66.9 | 100.4 | 133.8 | 167.3 |
| LPIC Power Consumption | MW | 0.0 | 5.7 | 11.4 | 17.2 | 22.9 | 28.6 |
| # TPM | Qty | 0.0 | 0.0 | 0.0 | 0.0 | 0.0 | 0.0 |
| Flow from TPMs | Lb/sec | 0.0 | 0.0 | 0.0 | 0.0 | 0.0 | 0.0 |
| HPIC Flow | LB/sec | 0.0 | 0.0 | 0.0 | 3.0 | 4.0 | 5.0 |
| HPIC Power consumption | MW | 0.0 | 0.0 | 0.0 | 0.4 | 0.6 | 0.7 |
| Flow From Tanks | LB/sec | 335.2 | 301.7 | 268.3 | 234.8 | 201.3 | 167.9 |
| TPM Fuel | MMBtu/hr | 0.0 | 0.0 | 0.0 | 0.0 | 0.0 | 0.0 |
| GT fuel | MMBtu/hr | 458.4 | 458.4 | 458.4 | 458.4 | 458.4 | 458.4 |
| Aux cooling load | Mw | 0.0 | 0.2 | 0.4 | 0.6 | 0.8 | 1.0 |
| Total Fuel Burn | BTU/kW hr | 458.4 | 458.4 | 458.4 | 458.4 | 458.4 | 458.4 |
| Heat rate (net) | BTU/kW hr | 5087.8 | 5445.7 | 5857.6 | 6337.1 | 6902.0 | 7577.4 |
| Duration full air tank will last | Hours | 2.0 | 2.2 | 2.5 | 2.9 | 3.3 | 4.0 |

TABLE 2B

Turn down mode at varying flows while operating LPICs

| Parameters | | | | | | | |
|---|---|---|---|---|---|---|---|
| % flow to GT | % | 100% | 90% | 80% | 70% | 60% | 50% |
| Tphase net output MW | MW | 60.5 | 51.3 | 42.2 | 33.0 | 23.9 | 14.7 |
| Plant BOP auxiliary load | MW | 1.5 | 1.5 | 1.5 | 1.5 | 1.5 | 1.5 |
| Flow to Tphase | lb/sec | 335.2 | 301.7 | 268.1 | 234.6 | 201.1 | 167.6 |
| # of LPCs injecting | Qty | 10.0 | 10.0 | 10.0 | 10.0 | 10.0 | 10.0 |
| LPIC flow | lb/sec | 167.3 | 167.3 | 167.3 | 167.3 | 167.3 | 167.3 |
| LPIC power consumption | MW | 28.6 | 28.6 | 28.6 | 28.6 | 28.6 | 28.6 |
| # of TPMs | Qty | 0.0 | 0.0 | 0.0 | 0.0 | 0.0 | 0.0 |
| Flow from TPMs | lb/sec | 0.0 | 0.0 | 0.0 | 0.0 | 0.0 | 0.0 |
| HPIC flow | lb/sec | 0.0 | 0.0 | 0.0 | 3.0 | 4.0 | 5.0 |
| HPIC power consumption | MW | 0.0 | 0.0 | 0.0 | 0.4 | 0.6 | 0.7 |
| Flow from tanks | lb/sec | 167.9 | 134.4 | 100.8 | 67.3 | 33.8 | 0.3 |
| TPM fuel | MMBTU/hr | 0.0 | 0.0 | 0.0 | 0.0 | 0.0 | 0.0 |
| GT fuel | MMBTU/hr | 458.4 | 412.5 | 366.7 | 320.9 | 275.0 | 229.2 |
| Auxiliary cooling load | Mw | 1.0 | 1.0 | 1.0 | 1.0 | 1.0 | 1.0 |
| Total fuel burn | BTU/kWh | 458.4 | 412.5 | 366.7 | 320.9 | 275.0 | 229.2 |
| Heat rate (net) | BTU/kWh | 7,557.4 | 8,036.5 | 8,695.0 | 9,718.8 | 11,528.9 | 15,595.2 |
| Duration full air tank will last | Hours | 4.0 | 4.5 | 5.3 | 7.0 | 11.9 | 1197.9 |

Figure 4C:
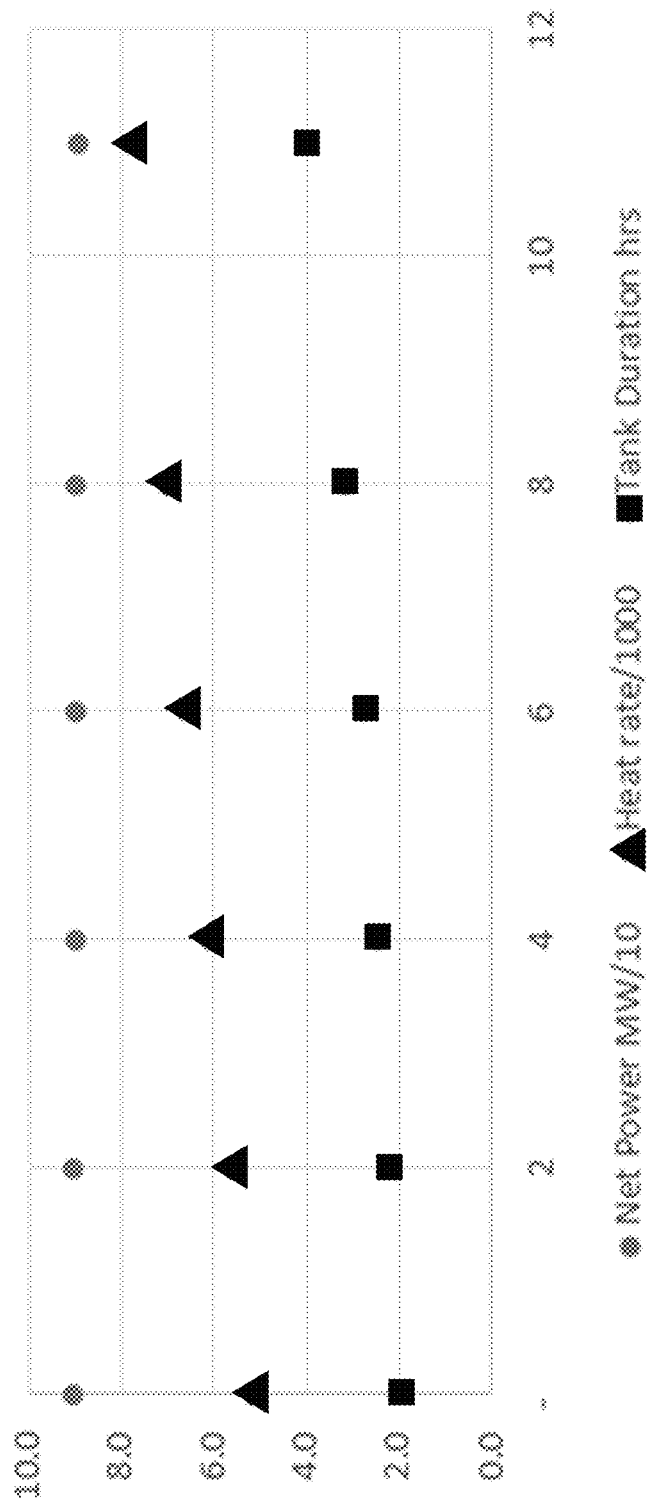
Figure 4D:
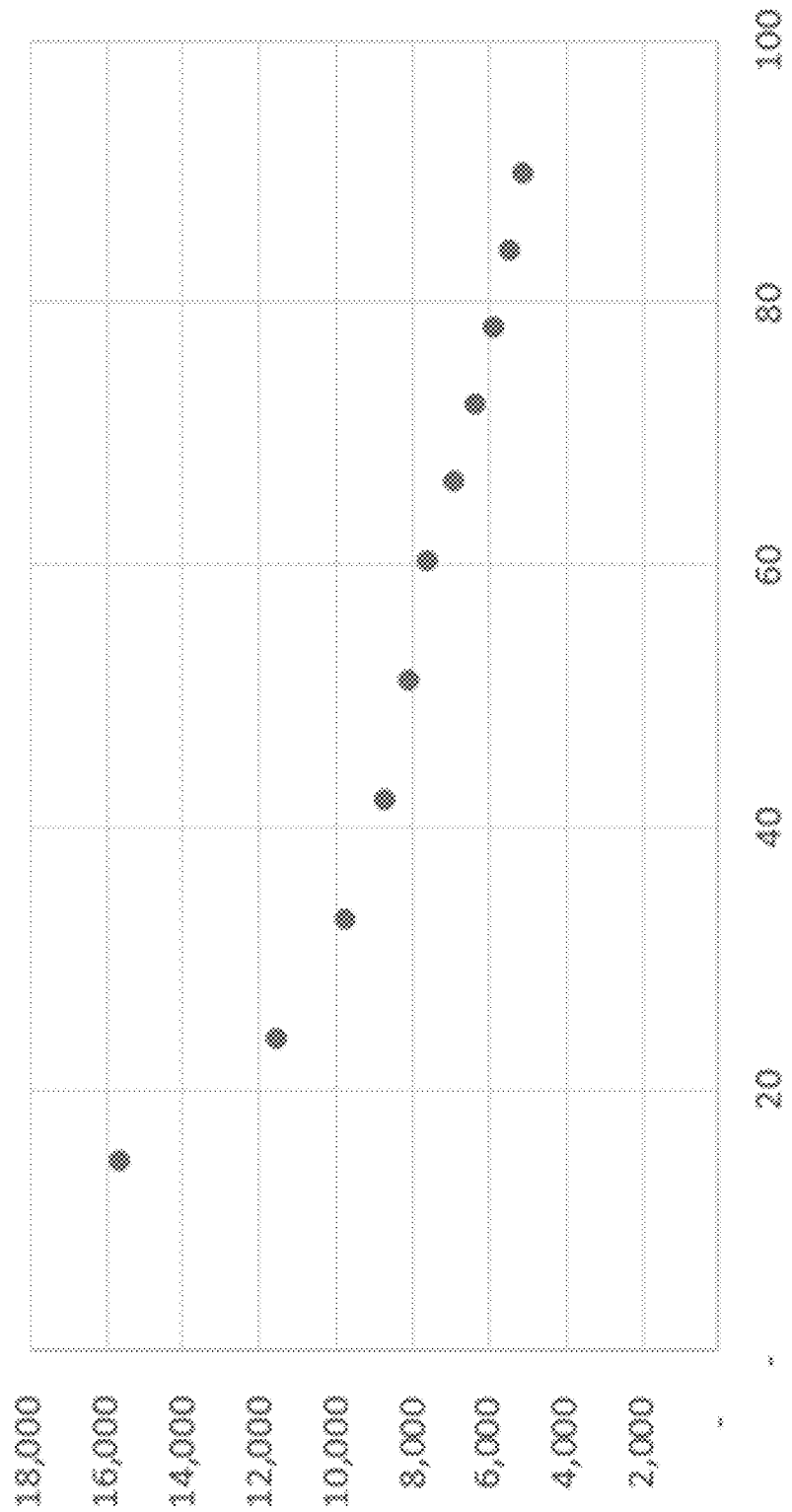

Table 2C is depicted below, and FIG. 4C shows a graphical representation of the data of Table 2C. Table 2C and FIG. 4C show how the compressed air storage system 207 output time may be increased (e.g., extended from two hours to four hours) while maintaining the ~90 MW output of the storage system 207 and engine 100 by operating varying numbers of TPMs 209.

TABLE 2C

Power Mode with extended tank duration by running TPMs

| Parameters | | Power Discharge Mode-extending air tank duration by running TPMs | | | | | |
|---|---|---|---|---|---|---|---|
| % flow to GT | % | 100% | 100.00% | 100.00% | 100.00% | 100.00% | 100.00% |
| Tphase Net output MW | MW | 90.1 | 89.9 | 89.7 | 89.5 | 89.3 | 89.0 |
| Plant BOP aux load | MW | 1.5 | 1.5 | 1.5 | 1.5 | 1.5 | 1.5 |
| Flow to Tphase | LB/sec | 335.2 | 335.2 | 335.2 | 335.2 | 335.2 | 335.2 |
| # LPC injecting | Qty | 0.0 | 0.0 | 0.0 | 0.0 | 0.0 | 0.0 |
| LPIC Flow | LB/sec | 0.0 | 0.0 | 0.0 | 0.0 | 0.0 | 0.0 |
| LPIC Power Consumption | MW | 0.0 | 0.0 | 0.0 | 0.0 | 0.0 | 0.0 |
| # TPM | Qty | 0.0 | 2.0 | 4.0 | 6.0 | 8.0 | 11.0 |
| Flow from TPMs | Lb/sec | 0.0 | 30.4 | 60.8 | 91.3 | 121.7 | 167.3 |
| HPIC Flow | LB/sec | 0.0 | 0.0 | 0.0 | 3.0 | 4.0 | 5.0 |
| HPIC Power consumption | MW | 0.0 | 0.0 | 0.0 | 0.4 | 0.6 | 0.7 |
| Flow From Tanks | LB/sec | 335.2 | 304.8 | 274.3 | 243.9 | 213.5 | 167.9 |
| TPM Fuel | MMBtu/hr | 0.0 | 41.0 | 82.0 | 123.0 | 164.0 | 225.5 |
| GT fuel | MMBtu/hr | 458.4 | 458.4 | 458.4 | 458.4 | 458.4 | 458.4 |
| Aux cooling load | Mw | 0.0 | 0.2 | 0.4 | 0.6 | 0.8 | 1.1 |
| Total Fuel Burn | BTU/kW hr | 458.4 | 499.4 | 540.4 | 581.4 | 622.4 | 683.9 |
| Heat rate (net) | BTU/kW hr | 5087.8 | 5555.3 | 6024.8 | 6496.4 | 6970.1 | 7684.7 |
| Duration full air tank will last | Hours | 2.0 | 2.2 | 2.4 | 2.7 | 3.1 | 4.0 |

Table 2D shows a turn down mode of the T-Phase engine 100 where the engine 100 may be turned down to zero MW by running the LPICs 201 and varying numbers of the TPMs 209, and storing some air in the storage system 207.

TABLE 2D

Turn down mode by running LPICs and TPMs

| Parameters | | Power Discharge Mode | | | |
|---|---|---|---|---|---|
| % flow to GT | % | 50% | 50% | 50% | 50% |
| Tphase Net output MW | MW | 14.7 | 9.8 | 4.9 | 0.0 |
| Plant BOP aux load | MW | 1.5 | 1.5 | 1.5 | 1.5 |
| Flow to Tphase | LB/sec | 167.6 | 167.6 | 167.6 | 167.6 |
| # LPC injecting | Qty | 10.0 | 10.0 | 10.0 | 10.0 |
| LPIC Flow | LB/sec | 167.3 | 167.3 | 167.3 | 167.3 |
| LFIC Power Consumption | MW | 28.6 | 28.6 | 28.6 | 28.6 |
| # TPM | Qty | 0.0 | 2.0 | 4.0 | 6.5 |
| Flow from TPMs | Lb/sec | 0.0 | 30.4 | 60.8 | 100.4 |
| Number of HPIC running | Qty | 0.0 | 1.0 | 2.0 | 3.0 |
| HPIC Flow | LB/sec | 0.0 | 33.5 | 66.9 | 100.4 |
| HPIC Power consumption | MW | 0.0 | 4.7 | 9.4 | 14.1 |
| Flow from Tanks | LB/sec | 0.0 | 0.0 | 0.0 | 0.0 |
| TPM Fuel | MMBtu/hr | 0.0 | 41.0 | 82.0 | 135.3 |
| GT fuel | MMBtu/hr | 229.2 | 229.2 | 229.2 | 229.2 |
| Aux cooling load | Mw | 1.0 | 1.2 | 1.4 | 1.7 |
| Total Fuel Burn | BTU/kW hr | 229.2 | 270.2 | 311.2 | 364.5 |
| Heat rate (net) | BTU/kW hr | 15595.2 | 27563.8 | 63397.6 | infinite |
| Duration full air tank will last | Hours | n/a | n/a | n/a | n/a |

Table 2E shows a 60 MW continuous mode where the full air flow is generated by operating a varying combination of TPMs 209 and LPICs 201, at varying turn down rates. Table 2E also shows an 84.9 MW continuous mode the full air flow is generated by a combination of TPMs 209 and LPICs 201.

TABLE 2E

60 MW/84.9 MW peaking mode with a varying number of TPMs

| Parameters | | Continuous Mode | | | |
|---|---|---|---|---|---|
| % flow to GT | % | 100% | 75% | 50% | 100% |
| Tphase Net output MW | MW | 59.4 | 38.9 | 21.2 | 84.9 |
| Plant BOP aux load | MW | 1.5 | 2.5 | 3.5 | 4.5 |
| Flow to Tphase | LB/sec | 335.2 | 251.4 | 167.6 | 335.2 |
| # LPC injecting | Qty | 10.0 | 9.0 | 7.0 | 0.0 |
| LPIC Flow | LB/sec | 167.3 | 150.6 | 117.1 | 0.0 |
| LPIC Power Consumption | MW | 28.6 | 25.7 | 20.0 | 0.0 |
| # TPM | Qty | 11.0 | 6.6 | 3.3 | 22.0 |
| Flow from TPMs | Lb/sec | 167.3 | 100.4 | 50.2 | 334.6 |
| Number of HPIC running | Qty | 0.0 | 0.0 | 0.0 | 0.0 |
| HPIC Flow | LB/sec | 0.0 | 0.0 | 0.0 | 0.0 |
| HPIC Power consumption | MW | 0.0 | 0.0 | 0.0 | 0.0 |
| Flow From Tanks | LB/sec | 0.0 | 1.0 | 2.0 | 3.0 |
| TPM Fuel | MMBtu/hr | 225.5 | 135.3 | 67.7 | 451.0 |
| GT fuel | MMBtu/hr | 458.4 | 343.8 | 229.2 | 458.4 |
| Aux cooling load | Mw | 2.1 | 1.6 | 1.0 | 2.2 |
| Total Fuel Burn | BTU/KW hr | 683.9 | 479.1 | 296.8 | 909.4 |
| Heat rate (net) | BTU/kW hr | 11514.6 | 12317.6 | 13971.4 | 10712.1 |
| Duration full air tank will last | Hours | n/a | | | |

Figure 4E:
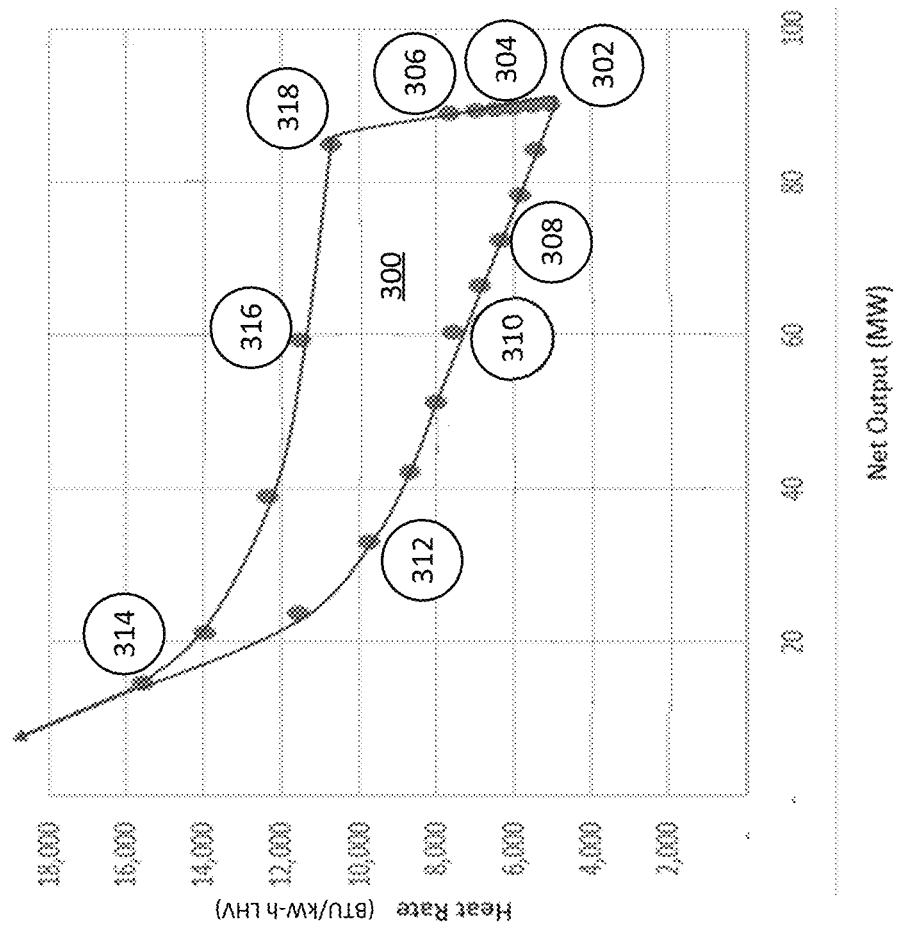

FIG. 4E is a compilation of various run modes that show the flexibility in output and corresponding heat rate of the T-Phase engine 100, in an embodiment. The area bounded by the three curves shows the operating area 300 of the system. Starting at the lower right corner, point 302 represents full air flow from the storage system 207, and as one goes to the left on the lower curve, 100% expander flow is developed by a combination of storage 207 air some LPICs 201 air, as the LPICs 201 are turned on to supply some of the air flow. This nets out some load up to point 310 where ten of the LPICs 201 are running. Further to the left, the ten LPICs remain running but the flow to the expander (i.e., the turbine 110) is cut from 100% to 50% at point 314. Again, starting at the lower right corner, point 302 represents full air flow from the storage system 207 and as one goes up, 100% flow is maintained by adding the air flow from an increasing number of TPMs 209 running. At point 318, twenty-two TPMs 209 deliver 100% expander flow and the only netting load is the auxiliary plant and cooling load as there is no power being used by the LPICs 201. Then traveling along the top curve from the top right, point 318 represents twenty-two TPMs 209 delivering 100% expander flow and as one moves to point 316, the expander flow is reduced to 50% with eleven TPMs 209. As one travels further to the left, electric driven LPICs 201 are turned on and TPMs 209 are turned off, holding expander flow at 50% until point 314 is reached where 50% expander flow is reached with ten LPICs 201 and no TPMs 209. One can also move to zero net output out of the system by holding 50% flow to the expanders, running all ten of the LPICs 201 and turning on about three of the five HPCs 204, consuming an additional 15 MW of power, resulting in net zero output and a portion of the LPIC 201 air going to feed the air storage system 208. At the same time six TPMs 209 are operating to maintain 50% expander flow.

The engine 100 may have, at point 302, a 90 MW output at 5,088 HR where the expander is at full flow and all air is from the tanks (e.g., a two hour duration). At point 304, the engine 100 may output 89.6 MW at 6,496 HR where air tank duration is extended to three hours by running four TPMs, resulting in an expander at full flow where ~80% of the air is from the tanks and ~20% is from the TPMs. At point 306, the engine 100 may output 89 MW at 7,684 HR where air tank duration is extended to four hours by running eleven TPMs, resulting in an expander at full flow where ~50% of the air is from the tanks and ~50% is from the TPMs. At point 308, the engine 100 may output 72 MW at 6,337 HR where air tank duration is extended to 2.9 hours by effectuating turndown with six electric LPCs drawing 17.2 MW, resulting in an expander at full flow where ~40% of the air is from the tanks and ~60% is from the LPCs. At point 310, the engine 100 may output 60.5 MW at 7,577 HR where air tank duration is extended to four hours by effectuating turndown with ten electric LPCs drawing 28.6 MW, resulting in an expander at full flow where ~50% of the air is from the tanks and ~50% is from the LPCs. At point 312, the engine 100 may output 33 MW at 9,719 HR where air tank duration is extended by effectuating turndown with ten electric LPCs, resulting in an expander at 70% flow where ~20% of the air is from the tanks and ~50% is from the LPCs. At point 314, the engine 100 may output 15 MW at 15,595 HR where turndown is effectuated with ten electric LPCs, resulting in an expander at 50% flow where 0% of the air is from the tanks and ~50% is from the LPCs. At point 316, the engine 100 may output 59.4 MW at 11,514 HR where the expander is at full flow where ~50% of the air is from the TPMs and ~50% is from the LPCs. At point 318, the engine 100 may output 85 MW at 10,712 HR where the expander is at full flow, where ~100% of the air is from the twenty-two TPMs.

As stated previously, the T-Phase engine and supplementary air supply embodiments described herein may remedy at least some of the issues experienced by conventional gas turbine systems. Specifically, the T-Phase engine technology may address: 1) the storage tank size and cost, which may allow the system to be located in more locations relative to conventional CAES systems, 2) the T-Phase engine may utilize single digit NOx state of the art combustors used in existing new gas turbines today, which may eliminate the need for expensive NOx selective catalytic reduction systems which can add 10% or more to the cost of the installation, and 3) the storage tank size and cost may be reduced by expanding the pressure range of the high pressure air storage above ground tanks. In the traditional CAES system, if the storage pressure is 1500 psi and the system is stopped at 650 psi, there is 850 psi of usable pressure, or 57% of the capacity of the system. With T-Phase engine, for the same storage pressure of 1500 psi the tanks can be discharged down to 206 psi in the case of a 6B gas turbine for a usable pressure range of 1294 psi, or 86% of the tank volume. This pressure range reduces the volume (and cost) requirement by 50% compared to conventional CAES systems. Further, the T-Phase engine system may have several smaller compressors instead of the one shaft line in the conventional CAES system, which may provide two benefits. First, the compression cycle can be operated in almost any power consumption level compared to the "on/off" nature of the traditional CAES system, which adds tremendous flexibility in terms of the ability to match power intake with a variable renewable resource, and second, the compressors may be readily available and expandable in relatively small blocks and are comparatively inexpensive. Another advantage of T-Phase engine may be that the expander section of the T-Phase engine may be a standard turbine section from a conventional gas turbine. Because this turbine section is effectively de-coupled from the compressor, all of the traditional turn down issues associated with the gas turbine's compressor may not exist. This may allow for an expanded turn down range which can be very important when the grid is trying to balance a fluctuating renewable resource. Finally, because the shaft line may be broken into a high pressure and a low pressure system, the T-Phase engine LPICs may operate to create the air flow to the T-Phase engine in a peaker mode. This peaker mode can be of similar value to the plant economics as the storage plant, thus doubling the potential revenue for the same cost.

Embodiments of the T-Phase engine and supplementary air supply described herein may use relatively small components (e.g., a smaller air storage system) and/or may use relatively less components, thusly achieving a smaller footprint than their conventional counterparts. As a result of the use of commonly available technology and equipment combined with the unique operating modes available, an estimated project cost of $56M USD can be realized for the 6B equivalent T-Phase engine, in an embodiment. This results in extremely low capital cost for the storage system ($150/kWhr), which is about $\frac{1}{6}^{th}$ the cost that conventional batteries advertise, in addition to their much shorter lifetime. Additionally, if one considers the Levelized Cost of Energy (LCOE) for the system, including the fuel burn of the TPMs 209 and the T-Phase engine 100 for a 4 hour/89.6 MW discharge at $2/MMBBTU fuel, it will come out to $6/MWhr, which is less than $\frac{1}{10}^{th}$ of the rate conventional batteries claim.

Resultantly, the T-Phase engine technology may have substantially increased commercial viability over traditional CAES (and other) plants while at the same time allowing the product to be situated in more locations.

As one skilled in the art can appreciate, instead of modifying an existing gas turbine and leaving the bladeless compressor, a new design could be developed that eliminates the gas turbine compressor altogether (e.g., by developing a static tunnel which is designed to passively direct incoming air, as described previously). Other options are also available to favorably decrease the start time of the T-Phase engine 100 by using a TPM 209 to inject hot air into the T-Phase engine 100 directly to preheat the engine 100. One skilled in the art would also appreciate that the various embodiments of the T-Phase engine and supplementary air supply system described herein may be implemented in any suitable combination. Further, while embodiments described herein used particular arrangements of T-Phase engine and supplementary air system components, any suitable number, size, and/or arrangement of the components described herein may be utilized to create a T-phase engine and supplementary air system that outputs a desired amount of power. For example, the number of TPMs 209, LPICs 201, and HPICs 204 may be reduced/increased to create a system that can produce less/more power than specific embodiments described herein. Table 3 shows various example arrangements for the T-Phase engine and supplementary air system that may output power similar to various conventional gas turbine sizes. Those of skill in the art would understand that any suitable number, size, and/or arrangement of components of the T-Phase engine and supplementary air system described herein may be used to create a power generation system that is comparable to its conventional gas turbine counterpart, such as a 6B gas turbine, a 7E gas turbine, a 7FA gas turbine, et cetera. Those of skill in the art may also appreciate that a T-phase engine and supplementary air system, when compared to its conventional counterpart, may have a comparatively reduced foot print size. This may be advantageous where it is desirable to reduce the space and cost of a gas turbine system.

TABLE 3

Various characteristics of T-Phase engines sized to their conventional counterparts

|  | 6B | 7E | 7FA |
| --- | --- | --- | --- |
| Max Expander flow rate (Lb/sec) | 335 | 670 | 1000 |
| output -storage only (MW) | 90 | 180 | 400 |
| tank farm dimensions (feet) | 90 × 90 | 125 × 125 | 160 × 160 |
| Plant footprint (feet) | 150 × 210 | 225 × 250 | 300 × 400 |
| HR storage air only (BTU/kWhr) | 5088 | 5088 | 3731 |
| Peaker output - TPM + LPC | 60 | 120 | 300 |
| HR Peaking (BTU/kWhr) | 10712 | 10712 | 7855 |
| number of TPM | 11 | 22 | 33 |
| Number LPC | 10 | 20 | 30 |
| Number of HPC | 5 | 10 | 15 |

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure. It will be understood that certain features and subcombinations are of utility and may be employed without reference to other features and subcombinations.

The invention claimed is:

1. A system, comprising: a gas turbine engine, said gas turbine engine comprising: a flow diffuser system; a combustor; a retrofitted compressor section, said retrofitted compressor section being devoid of stator airfoils between a plurality of retrofitted rotating blades, each of said plurality of retrofitted rotating blades being devoid of an airfoil said retrofitted compressor section retaining said plurality of retrofitted rotating blades; a turbine coupled to a shaft; a low pressure intercooled compressor; a high pressure intercooled compressor; a plurality of Turbophase modules, each of said plurality of Turbophase modules comprising a recuperative compressor having a compressor recuperator; a recuperator; and a compressed air storage tank, said compressed air storage tank selectively and fluidly coupled to said low pressure intercooled compressor, said high pressure intercooled compressor, and said recuperator; wherein: said high pressure intercooled compressor is configured to selectively receive compressed air from said low pressure intercooled compressor and is further configured to selectively compress said compressed air to a highly compressed air for storage in said compressed air storage tank; said compressed air storage tank is selectively and fluidly coupled to said gas turbine engine; and said low pressure intercooled compressor is configured to selectively bypass said high pressure intercooled compressor to deliver said compressed air to said gas turbine engine.

2. The system of claim 1, wherein said low pressure intercooled compressor comprises a plurality of low pressure intercooled compressors.

3. The system of claim 2, wherein said high pressure intercooled compressor comprises a plurality of high pressure intercooled compressors.

4. The system of claim 1, further comprising an isolation valve downstream of said low pressure intercooled compressor and upstream of said high pressure intercooled compressor.

5. The system of claim 1, wherein each of said compressed air storage tank and said low pressure intercooled compressor is configured to selectively deliver air to said gas turbine engine via said recuperator.

6. The system of claim 1, further configured to be switchable between a power mode and a turn down mode.

7. The system of claim 1, wherein said recuperator is configured to receive an exhaust of said gas turbine engine.

8. A system, comprising: a gas turbine engine, said gas turbine engine comprising: a flow diffuser system; a combustor; a retrofitted compressor, said retrofitted compressor being devoid of stator airfoils between a plurality of retrofitted rotating blades, each of said plurality of retrofitted rotating blades being devoid of an airfoil, said retrofitted compressor retaining said plurality of retrofitted rotating blades; and a turbine coupled to a shaft; a low pressure intercooled compressor; a high pressure intercooled compressor; a recuperator; and a compressed air storage tank, said compressed air storage tank being in fluid communication with said low pressure intercooled compressor via said high pressure intercooled compressor, and said recuperator; wherein: said high pressure intercooled compressor is configured to selectively receive compressed air from said low pressure intercooled compressor and is further configured to selectively compress said compressed air to a highly compressed air for storage in said compressed air storage tank; and each of said compressed air storage tank and said low pressure intercooled compressor is selectively and fluidly coupled to said gas turbine engine.

9. The system of claim 8, further comprising a generator coupled to said shaft.

10. The system of claim 8, wherein said low pressure intercooled compressor comprises a plurality of low pressure intercooled compressors.

11. The system of claim 10, wherein said high pressure intercooled compressor comprises a plurality of high pressure intercooled compressors.

12. The system of claim 8, further comprising an isolation valve downstream of said low pressure intercooled compressor and upstream of said high pressure intercooled compressor.

13. A method of operating a gas turbine system, the gas turbine system comprising a flow diffuser system, a retrofitted compressor, a combustor, a turbine coupled to a shaft, a plurality of low pressure intercooled compressors, a plurality of high pressure intercooled compressors, a plurality of Turbophase modules, each of said plurality of Turbophase modules comprising a recuperative compressor having a compressor recuperator, and a compressed air storage tank, said method comprising: generating compressed air with said plurality of low pressure intercooled compressors to form compressed air; compressing said compressed air with said plurality of high pressure intercooled compressors to form highly compressed air; storing said highly compressed air in said compressed air storage tank; and retrofitting said retrofitted compressor by removing a plurality of stator airfoils from a plurality of stators between a plurality of retrofitted rotating blades and removing a plurality of rotating airfoils from said plurality of retrofitted rotating blades, said retrofitted compressor retaining said plurality of retrofitted rotating blades.

14. The method of claim 13, further comprising causing said plurality of low pressure intercooled compressors to compress air that bypasses said plurality of high pressure intercooled compressors and is delivered to said gas turbine system.

15. The method of claim 13, further comprising isolating said compressed air storage tank and said plurality of high pressure intercooled compressors using a storage tank isolation valve.

* * * * *